(12) United States Patent
Sagot et al.

(10) Patent No.: US 7,869,443 B2
(45) Date of Patent: Jan. 11, 2011

(54) DEVICE AND METHOD FOR CONNECTION TO A WIRELESS NETWORK

(75) Inventors: Pierre Sagot, Sainte Luce sur Loire (FR); Florent Guichard, Nantes (FR); Stéphane Molton, Laval (FR)

(73) Assignee: Sercel (FR)

( * ) Notice: Subject to any disclaimer, the term of this patent is extended or adjusted under 35 U.S.C. 154(b) by 1004 days.

(21) Appl. No.: 11/262,955

(22) Filed: Nov. 1, 2005

(65) Prior Publication Data
US 2007/0025365 A1 Feb. 1, 2007

(30) Foreign Application Priority Data
Jul. 28, 2005 (FR) .................................. 05 08069

(51) Int. Cl.
*H04L 12/28* (2006.01)
(52) U.S. Cl. ........................................ 370/400; 455/101
(58) Field of Classification Search ................. 370/334, 370/400; 455/101
See application file for complete search history.

(56) References Cited

U.S. PATENT DOCUMENTS

| 2002/0024935 | A1* | 2/2002 | Furukawa et al. ........... 370/238 |
| 2003/0058826 | A1 | 3/2003 | Shearer, III |
| 2003/0214961 | A1 | 11/2003 | Nevo et al. |
| 2004/0095907 | A1* | 5/2004 | Agee et al. .................. 370/334 |
| 2005/0025104 | A1 | 2/2005 | Fischer et al. |
| 2005/0228613 | A1* | 10/2005 | Fullerton et al. ............ 702/150 |
| 2006/0095331 | A1* | 5/2006 | O'Malley et al. ............ 705/22 |

FOREIGN PATENT DOCUMENTS

WO   WO 01/35578 A1   5/2001

* cited by examiner

*Primary Examiner*—Man Phan
*Assistant Examiner*—Wei Zhao
(74) *Attorney, Agent, or Firm*—Fulbright & Jaworski, L.L.P.

(57) ABSTRACT

The invention relates to a device and a method, data acquisition device consisting of a wireless network comprising a first assembly of nodes, termed active nodes (100) of the network, and a second assembly of nodes, termed peripheral nodes (110) of the network, network for which one wishes to perform an access from peripheral nodes (110) to the network of active nodes (100), characterized in that it comprises means for organizing in a perfectly controlled manner a routing of the data and/or commands within the network of active nodes (100) according to a first mode of transmission of data and/or of commands, and means for transmitting data between the peripheral nodes (110) and the active nodes (100) according to a second mode of transmission of data, said first mode of transmission of data and/or of commands and said second mode of transmission of data being temporally separated.

9 Claims, 2 Drawing Sheets

DEVICE AND METHOD FOR CONNECTION TO A WIRELESS NETWORK

The invention relates to a wireless data acquisition network whose structure one wishes to modify without disturbing the acquisition of data, the transmission of data and/or commands.

More precisely, the present invention relates to a network of wireless seismic sensors whose structure one wishes to modify by adding new seismic sensors and/or by removing seismic sensors from the network without disturbing the acquisition of data, the transmission of data and/or commands.

The present invention applies in particular to the field of oil exploration. In this field of application, seismic sensors, disposed over the earth's surface, are used to receive the echoes of waves sent into the ground by a seismic source. A processing of these echoes makes it possible to obtain a map of the explored subsurface.

However the invention is not limited to the particular field of oil exploration and may be applied to any field of seismic application implementing a wireless data acquisition network, network which one wishes to make evolve without disturbing the acquisition and the transmission of data.

The person skilled in the art is aware of devices implementing a wireless data acquisition network.

In the case where the wireless data acquisition network is formed of an assembly of seismic sensors, these devices are conventionally and usually constituted by sensors linked together in groups to a "node" of the network. These nodes are generally organized in groups around a "concentrator", a group of nodes forms, with its concentrator, a subnetwork. The concentrators locally manage the subnetwork of nodes and centralize the data. The concentrators are connected to a local computer network, to which is connected a Central Unit which drives the assembly and records the data coming from the subnetworks. These networks exhibit several specific features.

Firstly, each node of the network must provide for its own energy supply, by means of a battery.

In this type of network, the data acquired at the level of each node are transmitted to a neighboring node and so and so forth until gradually reaching a destination of the data, which is the concentrator for a network of seismic sensors. This technique allowing the transmission of the data from node to node is called multi-hop. In a similar manner, the transmission of commands within this network is also performed by this multi-hop technique.

To implement this technique, it is necessary to make provision for specific means so that the time reference at the level of each node of the network can be common to all the nodes, doing so in order to obtain in particular acquisition data with good temporal accuracy.

In such a network, provision must moreover be made for a mode of transmission of the data and/or of the commands between the various nodes of the network, the mode of transmission with which one seeks to optimize the transfer of data and/or commands with the aim of minimizing the time taken by data acquired by one of the nodes of the network to arrive at its destination.

Several means of synchronization of the nodes and several modes of transmission of the data between nodes are in particular proposed in the prior art.

A particular problem related to these wireless data acquisition networks relates to the addition of nodes to the network so as to ensure its geographical deployment. Specifically, the number of nodes necessarily being limited, so is the zone covered by them.

Thus, to perform measurements on geographical zones bordering those covered by the network, it is obviously possible to stop the acquisition of the data and to move the whole of the network to this bordering zone. However, it is understood that this may take a great deal of time.

Hence, it is very beneficial to be able to implement a method allowing the continuous geographical deployment of this network, from nodes situated at the periphery of the geographical zone covered by the network (termed peripheral nodes), without disturbing the acquisition of seismic data, the transmission of status data and/or of seismic acquisition data, and the transmission of commands between the other nodes (termed active nodes). The peripheral nodes are then made to exchange data, namely status information, between themselves and with the active nodes. In the subsequent description, the term data will be invoked interchangeably for the peripheral nodes and the active nodes, it being understood that the distinction made hereinabove is applicable to the whole of the description.

Document US 2003/058826 proposes for example a device and a method of geographical deployment of a wireless communication network so as to allow the concentrator to recognize the peripheral nodes and integrate them in the guise of active node of the network. In this document, the connection of peripheral nodes to the active nodes of the network is performed by means of a specific node which is a node for access to the concentrator and according to a mode of transmission of data which is identical to the mode of transmission of the data and/or of commands of the network of active nodes. To perform the connection of the peripheral nodes, active nodes get allocated, in a static manner, timeslots programmed by the concentrator during which they can transmit data packets emanating from the peripheral nodes. To each time span there corresponds a data hop between an active node and a peripheral node.

The device and the method that are employed exhibit several drawbacks. Specifically, the allocating of the timeslots for the transmission of data between an active node and a peripheral node is performed on the basis of the information of the volume of data and/or of commands to be transmitted which is requested by each node of the network. If the node has no data to be sent and/or commands to be transmitted, the time span is unused, bandwidth is lost, and energy is expended needlessly.

Moreover, the allocating of timeslots for communication between a peripheral node and an active node of the network disturbs the steady operation of the network of active nodes, since during these timeslots, the data and/or commands are locked in the active node: there is no continuous and simultaneous transmission of data and/or of commands between the active nodes of the network.

The devices and methods currently employed must therefore be improved.

This aim is achieved within the framework of the present invention by virtue of a data acquisition device for seismic application consisting of a wireless network comprising a first assembly of nodes, termed active nodes of the network, and a second assembly of nodes, termed peripheral nodes of the network, network for which one wishes to perform an access from peripheral nodes to the network of active nodes, characterized in that it comprises means for organizing in a perfectly controlled manner a routing of the data and/or commands within the network of active nodes according to a first mode of transmission of data and/or of commands, and means for transmitting data between the peripheral nodes and the active nodes according to a second mode of transmission of data, said first mode of transmission of data and/or of commands and said second mode of transmission of data being temporally separated.

This aim is also achieved within the framework of the present invention by virtue of a method of data acquisition for seismic application within a wireless network comprising a first assembly of nodes, termed active nodes of the network and a second assembly of nodes of the network, termed peripheral nodes of the network, network for which one wishes to perform an access from peripheral nodes to the network of active nodes, said method comprising the steps consisting in:

organizing in a perfectly controlled manner a routing of the data and/or of the commands within the network of active nodes according to a first mode of transmission of data and/or of commands, transmitting data between the peripheral nodes and the active nodes according to a second mode of transmission of data, separated temporally from the first mode of transmission of data and/or of commands.

Other characteristics, aims and advantages of the present invention will become apparent on reading the detailed description which follows, and in conjunction with the appended drawings, given by way of nonlimiting examples and in which.

Figure 3:
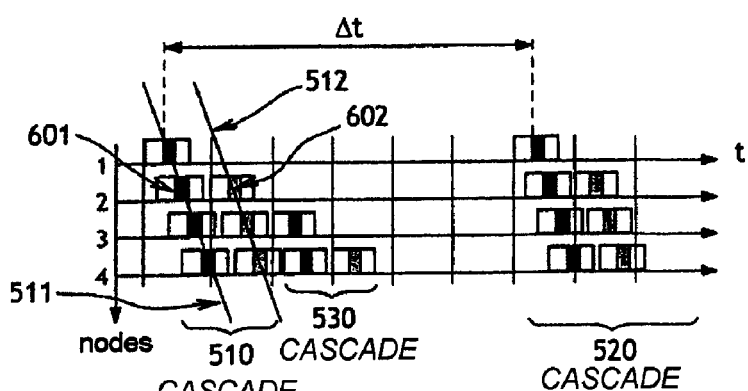

FIG. 3 presents a variant embodiment of the organization of the transmission of the data within the wireless data acquisition.

Figure 1:
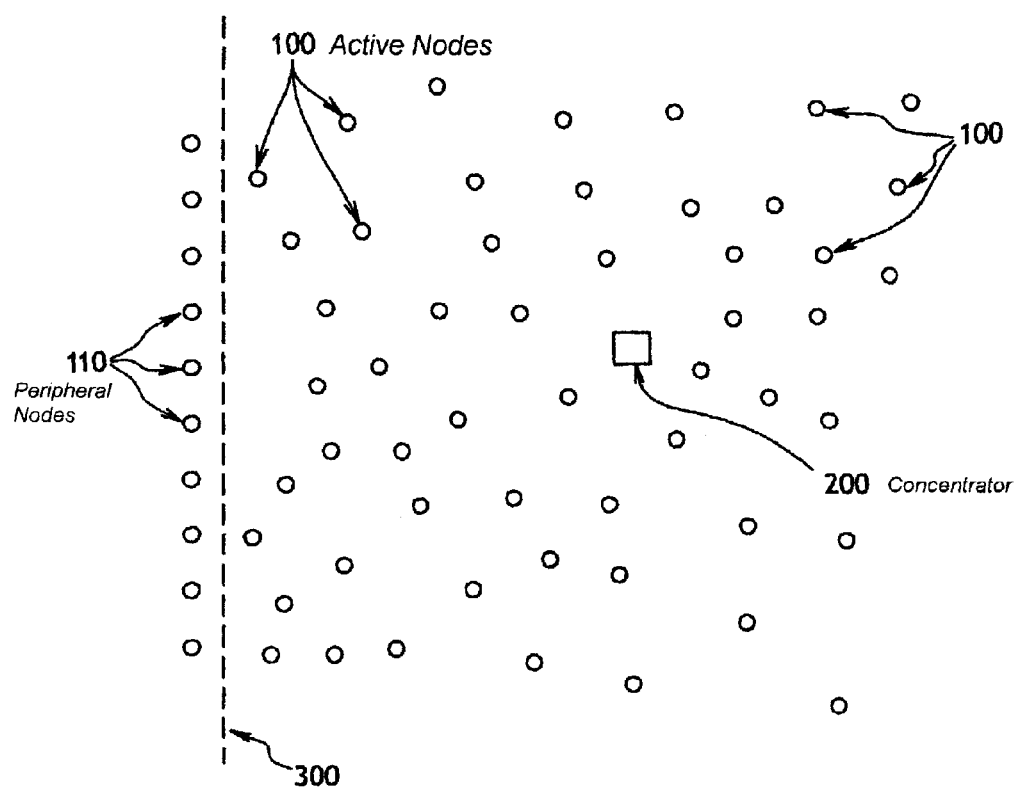
FIG. 1 represents a wireless data acquisition network consisting of an assembly of nodes in accordance with the present invention.

FIG. 1 presents a data acquisition network comprising active nodes 100, a concentrator 200 and an assembly of peripheral nodes 110. The peripheral nodes 110, separated symbolically from the network formed at the active nodes 100 by the line 300, are nodes which are not connected to the concentrator 200 and that one seeks to connect to this concentrator and more generally to the network formed of active nodes without disturbing the normal operation of the latter.

In the case of an application to the seismic field, the network in fact comprises a concentrator 200 whose functions are to centralize the data sent and/or relayed by the various nodes 100, 110 and to organize the network by generating commands relayed by the various active nodes 100 down to the peripheral nodes 110 or down to an active node 100. As appropriate, this concentrator 200 may also serve as local geographical reference for all the nodes 100, 110 of the network. In all cases, the position of the concentrator 200 must be known accurately, for example by means of a satellite based positioning system included in the concentrator.

The mode of transmission of the data, acquired within the network, between the various nodes 100, 110 of the network is organized in a controlled manner, preferably by the concentrator 200 which in order to this generates commands transmitted according to a mode of transmission identical to the acquisition data.

As regards the network of active nodes 100, the mode of transmission of the data and/or of the commands which is employed is a TDMA mode (standing for the Anglo-Saxon expression "time division multiple access"). This mode of transmission relies on the allocating of dedicated timeslots to each of the active nodes 100 of the network. To do this, the concentrator 200 relies on a satellite based positioning system included in each of the active nodes 100.

More accurately, as the satellite based positioning system of an active node 100 of the network comprises means for ascertaining the position of the active nodes 100 and of the concentrator 200 within the network relative to a local reference and means for ascertaining the universal time, this universal time also being known by a concentrator 200, the concentrator 200 is able to ascertain the position of the active nodes 100 (direction, distance) with respect to it and, in combination with the common time reference, to ascertain at each instant the active nodes 100 in which the data are located and in what quantities.

The allocation of the timeslots by the concentrator 200 therefore depends on the geographical layout of the active nodes 100. By way of nonlimiting example, each active node 100 of the network of active nodes may get allocated, by way of the commands emanating from the concentrator 200, timeslots in which it has to send, timeslots in which it has to keep data which it has acquired or data and/or commands originating from other active nodes 100, and finally timeslots in which it has to receive the data and/or the commands originating from one or more other active nodes 100. However, if the concentrator 200 allocates timeslots to the active nodes 100, the effective transmission of the data and/or of the commands between the active nodes 100 of the network may be performed other than by the authorization of the concentrator 200.

Through this mode, organized in a controlled manner, of transmission of data and/or of commands, the congestion of the nodes is minimized and the transmission time for transmitting data from their detections at the level of a sensor until their arrival at the destination is also minimized. Consequently, the overall effective rate of the device is optimized.

Moreover, the timeslots during which an active node 100 does not send or transmit are harnessed so as to place this active node 100 on standby and thus save energy.

As regards the peripheral nodes 110, the mode employed of transmission of data between them and with the active nodes 100 respectively located in their immediate proximities is a CSMA mode (standing for the Anglo-Saxon expression "carrier sense multiple access"). Conventionally, in this mode of data transmission, no timeslot is dedicated specifically to a node. The transmission of the data from nodes to nodes is done randomly.

More accurately, if at a date t, no transmission occurs in a node, this node can transmit data on a channel. If on the other hand two nodes send data at one and the same time to a third node on this common channel, there is collision and no transmission of data can be performed between these nodes. After a random time interval specific to each of the two sender nodes, these latter resend to the third node, with a high chance of sending distinct dates, thereby making it possible to transmit data.

Within the framework of the present invention, it is however necessary to adapt the TDMA data transmission mode so that the connection of the peripheral nodes 110, operating in CSMA mode, to the network of active nodes 100 operating in TDMA mode and to the concentrator 200 is effective.

To do this, specific timeslots are allocated preferably by the concentrator 200 during which the peripheral nodes 110 and the active nodes 100 located in their immediate proximities may exchange data in CSMA mode. The two modes of transmission CSMA and TDMA are therefore separated temporally, thereby avoiding any interference with the active nodes 100 which transmit data in TDMA mode and receive commands preferably from the concentrator 200 also in TDMA mode, commands being relayed up to the peripheral nodes 110. Indeed, preferably, the transmission of the data in CSMA mode and in TDMA mode being performed on the same channel, it is then necessary to allocate specific timeslots so as to avoid interference.

The allocating of these timeslots thus allows the detection of the peripheral nodes by the concentrator 200. To do this, the peripheral nodes 110 must be synchronized with the concentrator 200 and with the active nodes 100 of the network so as to have a common time reference. Once detected by the concentrator 200, the peripheral nodes can be integrated with the network of active nodes 100.

Figure 2:
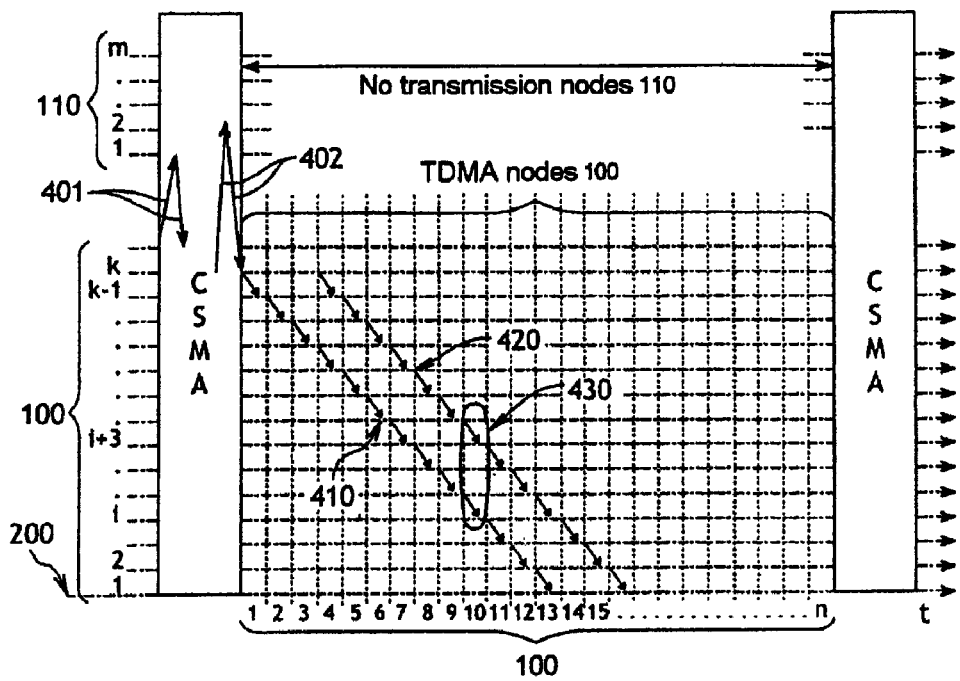
FIG. 2 represents an organizational diagram of the transmission of the data within the wireless data acquisition network.

FIG. 2 presents an organizational diagram of the transmission of the data within the wireless data acquisition network and ensuring the detection of the peripheral nodes 110 by the concentrator 200. This diagram presents as abscissa the time t, the active nodes 1, 2, . . . , n of the network and also the concentrator 200 and presents as ordinate, active nodes referenced 1, 2, . . . k and peripheral nodes referenced 1, 2, . . . , m.

In this FIG. 2, the curve 401 represents data exchanges between the active node k of the network of active nodes 100 and the peripheral node 1 of the assembly of peripheral nodes 110. In a similar manner, the curve 402 represents data exchanges between the active node k−1 of the network of active nodes 100 and the peripheral node 2 of the assembly of peripheral nodes 110. These data exchanges between the peripheral nodes 110 and the active nodes 100 are performed in CSMA mode.

Additionally, curves 410 and 420 represent respectively the routing to the concentrator 200 of two data packets within the network of active nodes 1, 2, . . . , n. These data packets emanate from the peripheral nodes that one wishes to connect to the concentrator 200 so as to integrate them with the network of active nodes 100. The routing of the data packets, performed within the network of active nodes 100, is in TDMA mode and is in this regard organized preferably by the concentrator 200.

Curves 410 and 420 each form an upstream fixed cascade, directed toward the concentrator 200 so as to repatriate the data as rapidly as possible. In a similar manner, the concentrator 200 dispatches its instructions (commands) in the form of a downstream fixed cascade (not represented) across the network of active nodes 100 up to the peripheral nodes 110.

By way of example, to produce an upstream cascade, the timeslots are allocated in such a way that while a node i of the network of active nodes is in send mode, node (i−1) is in receive mode so as to receive the data from node i. Then another timeslot is allocated to node (i−1) during which it sends the data to node (i−2) which is then in receive mode and so on and so forth. The nodes which are neither in receive mode nor in send mode place themselves in standby mode.

FIG. 3 presents a variant embodiment of the organization of the transmission of the data within the wireless data acquisition network. In this embodiment, successive data packets, sent by node with a time interval (Δt) ascend toward the concentrator in the form of a cascade 510, 520 similar to the description backed up by FIG. 2.

However, in order to make best use of the entire bandwidth and avoid congestions at the level of the nodes, it is conceivable to send the data of a node in several times. For example, in the cascade 510 of this FIG. 3, there is allocated a timeslot 601 to the node 2 during which the latter sends a first part of the data that it contains to the node 3 according to the cascade 511. The remaining part of the data is sent later by this same node 2 to the node 3 over a timeslot 602. These data are themselves transmitted to the concentrator according to an ascending cascade 512. Obviously, the sending of the whole of the data contained by an active node may be performed in more than two times.

Within the framework of the present invention, it is also conceivable to provide several channels to facilitate the transmission of the data and/or of the commands within the network. For multichannel (several radio frequencies used) a node typically get allocated a time and frequency slot for sending every two time and frequency slots, thereby making it possible to accelerate the transmission of the data and/or of the commands. Additionally, the use of several channels makes it possible to limit interference. Specifically, in FIG. 2, it is observed for example (reference 430) that the node 10 receives at the same time data originating from node i and from node i+3 and that the use of two distinct frequencies for the transmission of the data between the node i and the node 10 on the one hand and between the node i+3 and the node 10 on the other hand can only improve the quality of data transmission between these active nodes.

The implementation of several channels is especially beneficial in the zones of the network where the nodes receive, store or send a lot of data and/or of commands. That is the case in the neighborhood of the concentrator since all the data acquired at the level of each node are transmitted to it. That is also the case when the network comprises a lot of nodes.

In all cases, this allocation of the time and frequency slots is carried out as a function of the geographical location of the nodes with respect to the concentrator.

The subject of the present invention describes a mode of access from peripheral nodes to a network of active nodes of a data acquisition device. The removal of an active node from the network of active nodes is for its part very simple to implement since the mode of transmission of the data within this network of active nodes, namely the TDMA mode, makes it possible to prevent a node from transmitting data if no timeslot is allocated to it. Thereby, an active node can be isolated and then disconnected without disturbing the normal operation of the network of active nodes.

The present invention is not limited to the application to the seismic field in which a concentrator organizes and centralizes the data but extends to any variant in accordance with the spirit thereof. In particular, a network of nodes exchanging data and in which the destination of the data is another node of the network is in accordance with the present invention, the controlled organization of the transmission of the above described data being performed by the nodes themselves.

Finally, a wireless network of nodes in accordance with the present invention is not limited to a data acquisition device but may extend to any communication device.

The invention claimed is:

1. A data acquisition device for seismic applications including a wireless network comprising:

a first assembly of first active nodes, a concentrator for organizing in a controlled manner a routing of data and/or commands within the first assembly of first active nodes according to a TDMA mode of transmission of data and/or of commands, in which the transmission of data and/or of commands is done in first time slots, a second assembly of second peripheral nodes, wherein the second peripheral nodes operate in a CSMA mode of transmission of data and/or of commands, wherein the concentrator has means to allocate dedicated first time slots to each of the first active nodes to transmit data and/or commands between the first active nodes in said TDMA mode, and wherein the concentrator has means for allocating second time slots to transmit data and/or commands between the second peripheral nodes and the first active nodes, wherein the transmission of data and/or of commands between the second peripheral nodes and the first active nodes is done in said CSMA mode during said second time slots which are temporally separated from said dedicated first time slots;

wherein the transmission of data and/or commands according to said TDMA mode in said first time slots occurs on the same channel of said wireless network as the transmission of data and/or commands according to said CSMA mode during said second time slots.

2. The device according to claim 1, wherein each second node comprises a satellite-based positioning system for allowing its synchronization with the first nodes of the first assembly.

3. The device according to claim 1, wherein the concentrator has means to organize the transmission of the data and/or of the commands within the first assembly of first nodes by consecutively allocating first receive and send timeslots to two neighboring first nodes of the first assembly, thus forming a cascade of data and/or of commands.

4. The device according to claim 1, wherein the wireless network is organized in such a way that the first nodes self-authorize the transmission of the data and/or of the commands within the first assembly of first nodes on several occasions, thus forming several cascades of data and/or of commands.

5. The device according to claim 1, wherein nodes comprise means for sending and/or receiving data and/or commands on several frequency channels.

6. A method of data acquisition for seismic acquisition within a wireless network comprising a first assembly of first active nodes, a second assembly of second peripheral nodes, wherein the second peripheral nodes operate in a CSMA mode of transmission of data, said method comprising the steps of:

organizing in a controlled manner a routing of data and/or commands within the first assembly of first active nodes according to a TDMA mode of transmission of data and/or of commands, in which the transmission of data and/or of commands is done in first time slots, allocating dedicated first time slots to each of the first nodes to transmit data and/or commands between the first active nodes in said TDMA mode, and allocating second time slots to transmit data and/or of commands between the second peripheral nodes and the first active nodes, wherein the transmission of data and/or of commands between the second peripheral nodes and the first active nodes is done in said CSMA mode during said second time slots which are temporally separated from said dedicated first time slots;

wherein said first time slots for said TDMA mode of transmission and said second time slots for said CSMA mode of transmission are time slots on the same channel.

7. The method according to claim 6, further comprising the step of:

organizing the transmission of the data and/or of commands within the first assembly of first nodes by consecutively allocating first receive and send timeslots to two neighboring first nodes of the first assembly, thus forming a cascade of data and/or of commands.

8. The method according to claim 6, further comprising the step of:

organizing the transmission of the data and/or of the commands within the first assembly of first nodes by sending the data and/or the commands contained in a first node on several occasions, thus forming several cascades of data and/or of commands.

9. The method according to claim 6, further comprising the steps of:

sending and/or relaying from first nodes data and/or commands on several frequency channels, and receiving from first nodes data and/or commands on several frequency channels.

* * * * *